United States Patent [19]
Friend et al.

[11] 3,953,775
[45] Apr. 27, 1976

[54] PROPULSION CONTROL SYSTEM FOR ELECTRICALLY POWERED VEHICLES

[75] Inventors: Aaron D. Friend; Hilmer C. Lindahl, both of Longview, Tex.

[73] Assignee: R. G. LeTourneau, Inc., Longview, Tex.

[22] Filed: Mar. 23, 1973

[21] Appl. No.: 344,080

Related U.S. Application Data

[63] Continuation of Ser. No. 139,451, May 3, 1971.

[52] U.S. Cl. ............................ 318/147; 318/157; 318/158; 290/14
[51] Int. Cl.² ........................................ B60L 11/02
[58] Field of Search .......... 318/147, 157, 146, 158; 290/14

[56] References Cited
UNITED STATES PATENTS

| | | |
|---|---|---|
| 3,551,685 | 12/1970 | Corry .............................. 318/147 X |
| 3,585,473 | 6/1971 | Huxtable et al. ............... 318/147 X |

Primary Examiner—B. Dobeck
Attorney, Agent, or Firm—Wofford, Felsman, Fails & Zobal

[57] ABSTRACT

Propulsion control system for electrically powered vehicles, typically heavy duty off-road type work vehicles having electric motor driven wheels. In embodiment shown, power is supplied from direct current generator driven by internal combustion engine. Motor and generator field excitation is automatically varied responsive to selected machine operating conditions and improved means are provided to accomplish such variation. The provision and application of certain propulsion system parameters effects improved machine performance with minimum demand for operator skill and attention.

4 Claims, 13 Drawing Figures

INVENTORS
Aaron D. Friend
Hilmer C. Lindahl
BY
Wofford, Felsman, & Fails
ATTORNEYS

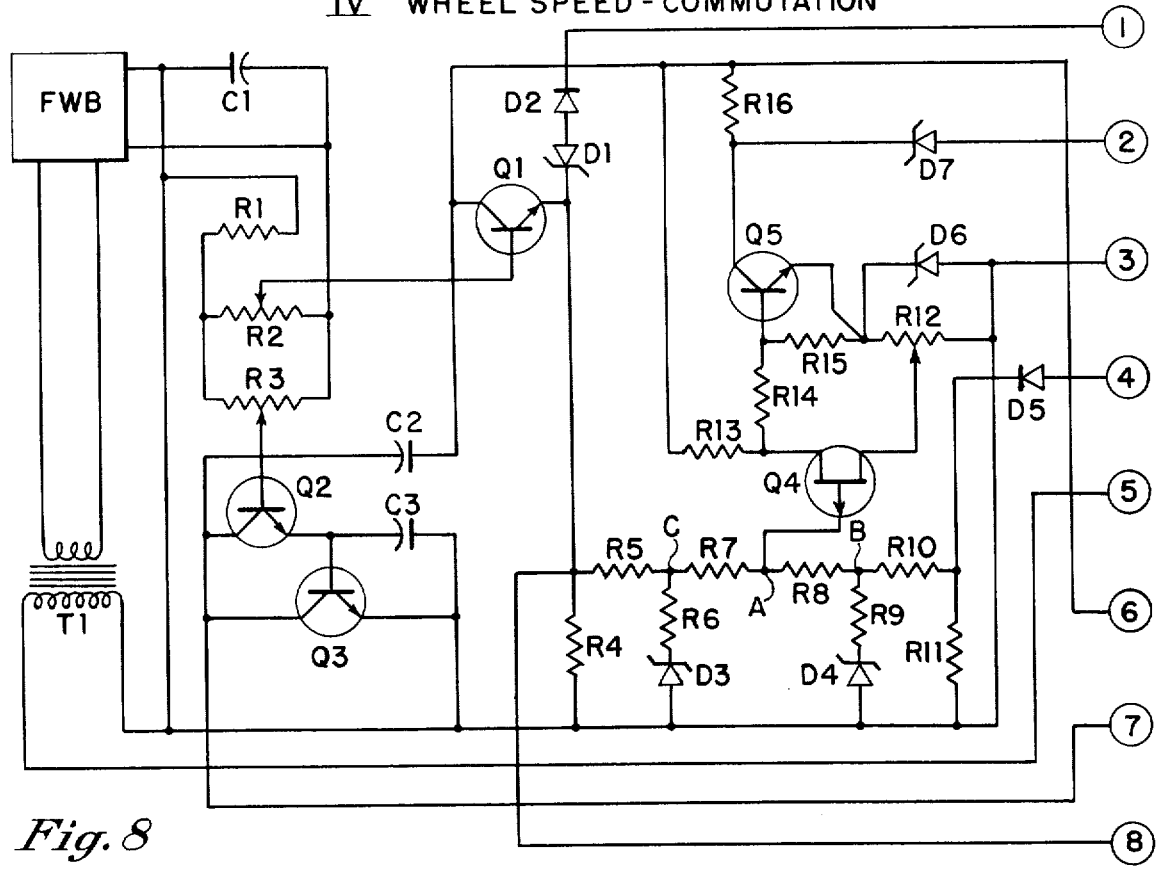
*Fig. 8*    IV WHEEL SPEED - COMMUTATION
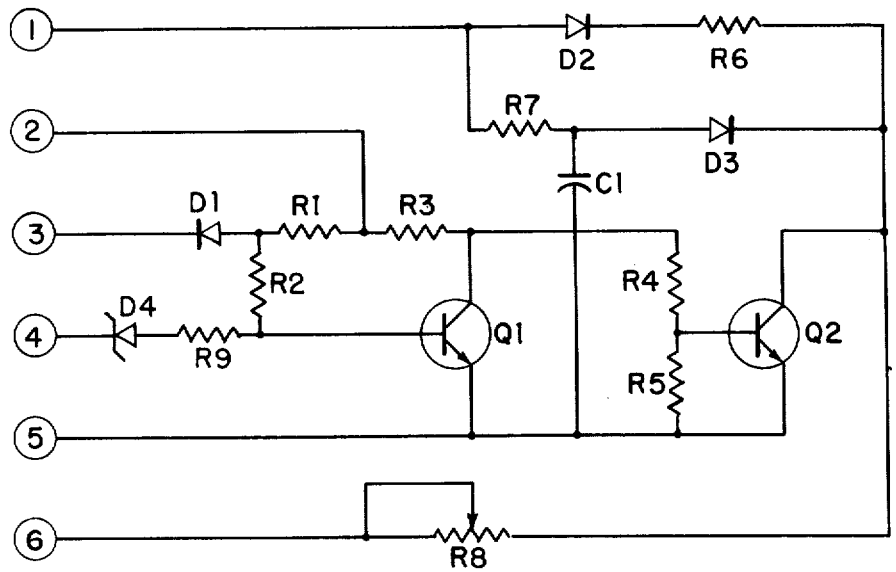
*Fig. 9*    VI FAIL - SAFE Fig.10 — V ACCELERATOR CONDITIONER Fig.11 — XI BRAKING FIELD BOOST Fig.12 — 24 VOLT D.C. SOURCE / CURRENT LIMITER

X ENGINE MONITOR

3,953,775

PROPULSION CONTROL SYSTEM FOR ELECTRICALLY POWERED VEHICLES

This is a continuation of application Ser. No. 139,451, filed May 3, 1971.

FIELD OF INVENTION

This invention relates to propulsion control systems for electrically powered vehicles, and more particularly to systems, apparatus and arrangements for controlling vehicles wherein the vehicle wheels are driven by direct current electric motors which are supplied power from one or more direct current generators, which in turn are powered by one or more internal combustion engines.

PRIOR ART

Many types of control systems have been devised in the prior art of which we are aware for various applications involving vehicles driven by electric traction motors supplied power from internal combustion engine driven generators, a notable example being diesel-electric trains. However, the particular type application with which our invention is primarily concerned is that of the heavy duty type self-propelled, rubber-tired, off-road vehicle and/or mobile self-propelled work performing machine. Machines of this general class include, by way of example, off-road transport vehicles; earth moving and earth working machines such as scrapers, dozers, tractors, front end loaders and haulers; land clearing machines; logging machines; mobile cranes; heavy duty cranes or hoist; and the like. The requirements for the propulsion control systems of such machines are quite severe. The operational requirements of such machines often involve wheel motor loads and speeds that vary over a wide range and often at rapid rates. Moreover, such machines and particularly those that involve powered work functions in addition to propulsion, for example, scrapers, dozers or front end loaders, require considerable operator experience, skill and judgment for most effective and efficient operation.

U.S. Pat. Nos. 3,102,219, 3,417,304, and 3,492,556 disclose propulsion control systems for electrically powered vehicles of the type hereinbefore referred to. The present invention is concerned with improvements to such propulsion control systems.

BRIEF DESCRIPTION OF THE DRAWINGS

FIGS. 3 through 11 and 13 are schematic circuit diagrams showing details of the various component circuits that are shown as blocks in FIG. 2, each being labeled with the title and Roman numeral designation of its corresponding block.

FIG. 12 is a schematic diagram showing a DC power source and a ground or common and identifying the various component circuit terminals that are connected to each, for correlation with the other Figs. of the drawings.

DESCRIPTION OF PREFERRED EMBODIMENTS

It is a primary object of this invention to provide an improved propulsion control system for vehicles of the general class hereinbefore identified.

It is an object of this invention to provide a vehicle propulsion control system wherein there is incorporated improved means for varying the field excitation of the direct current generator or generators that supply power to the vehicle wheel motors, responsive to various propulsion system conditions.

Another object of this invention is to provide a vehicle propulsion control system wherein there is incorporated improved means for varying the field excitation of the wheel motors responsive to various propulsion control system conditions.

Another object of this invention is to provide a vehicle propulsion control system wherein improvements involve variation of DC generator and/or wheel motor field excitation responsive to one or more of certain selected propulsion system parameters or conditions.

Another object of this invention is to provide a vehicle propulsion control system wherein improvements involve measures taken to enhance machine performance under the condition of rapid acceleration demand.

Another object of this invention is to provide a vehicle propulsion control system wherein improvements involve measures taken to enhance machine performance under the condition of rapid machine deceleration.

Another object of this invention is to provide a vehicle propulsion control system wherein improvements involve measures taken to obtain optimum machine performance with minimum requirement of operator skill.

Another object of this invention is to provide a vehicle propulsion control system wherein improvements involve utilization of signals sensed from the internal combustion engine to modify the effect of system demands such that the engine is kept within its optimum performance range.

These and other objects are effected by this invention as will become apparent to one skilled in the art when the following descriptive matter is read in conjunction with the drawings.

The term "vehicle" is used herein to include any vehicle to which the present invention is applicable, in addition to the wheeled vehicles that are specifically discussed herein with reference to the description of the preferred embodiments of the invention.

Figure 1:
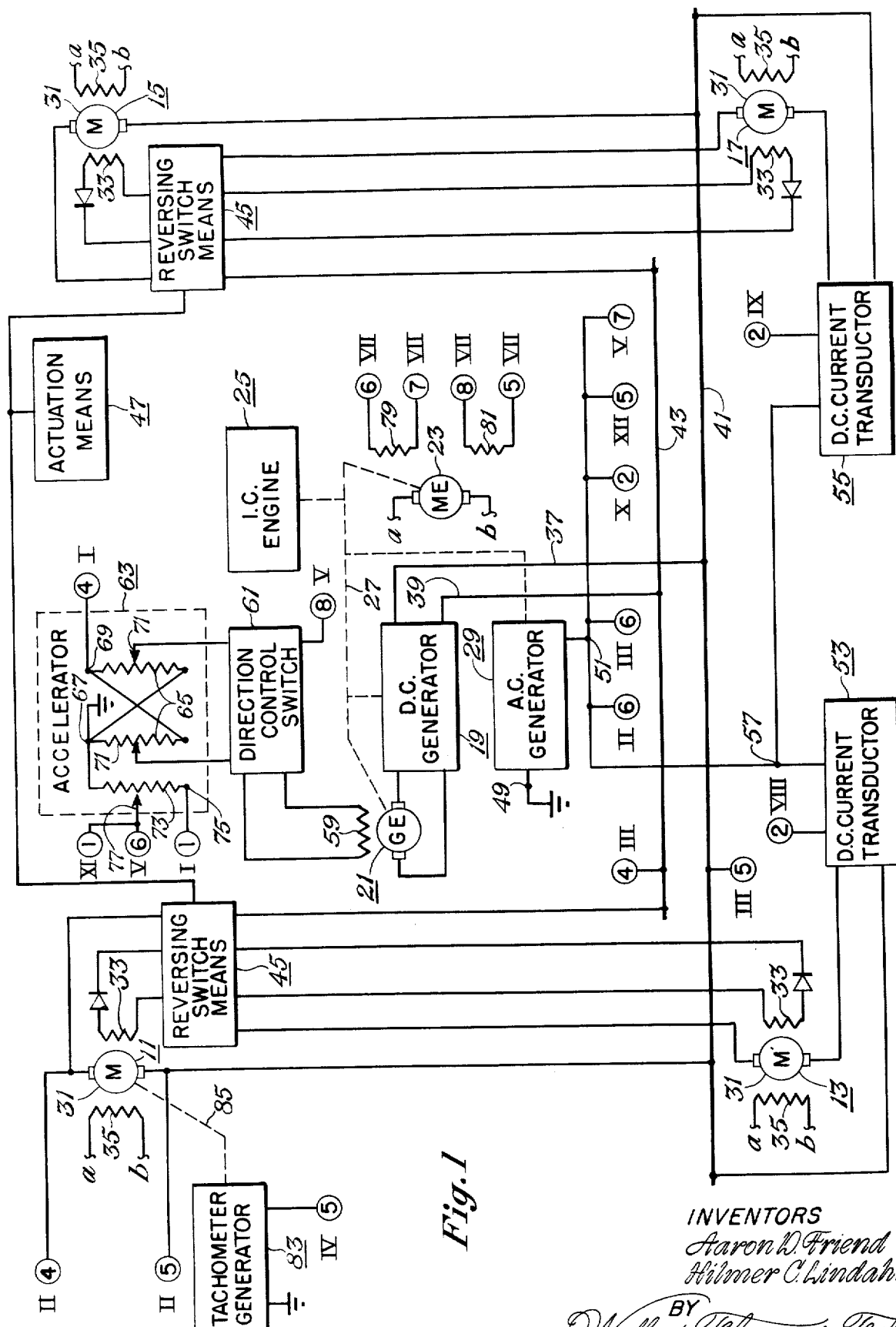
FIG. 1 is a schematic circuit diagram showing the organization and the relation of the primary components of a vehicle propulsion control system in accordance with a preferred embodiment of the invention.
Figure 14:
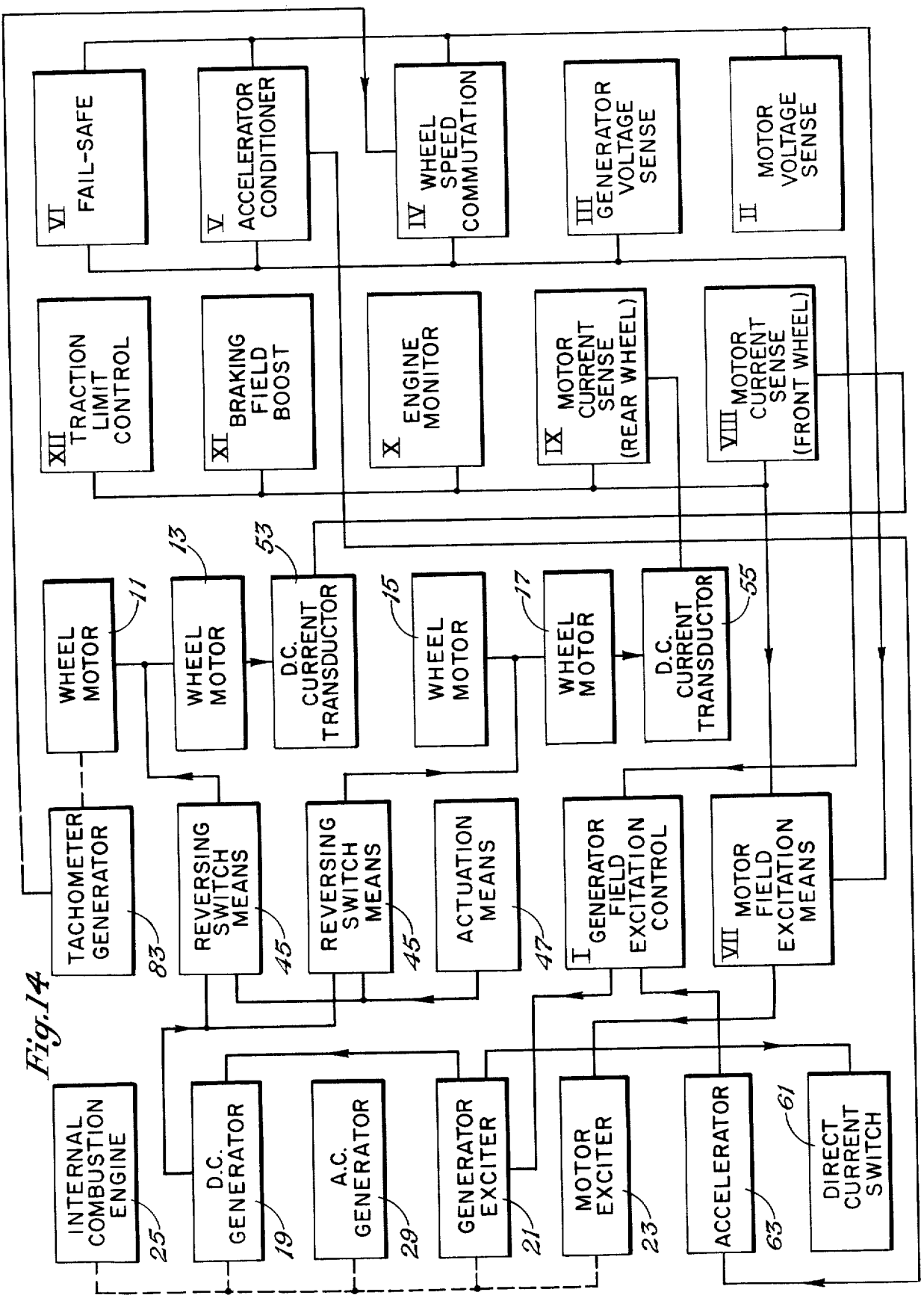
FIG. 14 is an overall functional block diagram of the propulsion control system in accordance with a preferred embodiment of the invention.

Referring to FIG. 1, and FIG. 14 there are shown four direct current traction or drive motors 11, 13, 15 and 17. These motors are incorporated into self-contained vehicle wheel drive units. Such wheel drive units include a gear reduction unit built into the wheel structure, with the traction motor driving the gear reduction in it. The wheel drive units are then mounted to the vehicle axles. For details of such wheel drive units (sometime referred to as "electric wheels") reference is made to U.S. Pat. No. 2,726,726. For purposes of discussion herein, the wheeled vehicle of the illustrated preferred embodiments will be assumed to have four wheels, each of which is an "electric wheel". It should be understood, however, that the present invention is applicable also to wheeled vehicles having either less or more than four "electric wheels", as well as to pertinent vehicles that are not "wheeled"; for example, hoists.

Also shown in FIGS. 1 and 14 are a DC generator 19, a generator exciter 21, a motor exciter 23 and an AC generator, all driven by an internal combustion engine 25 via conventional mechanical linkages, indicated by the dashed lines 27. While only one engine and DC generator are shown, the present invention is also applicable in cases where more than one engine-generator set is used. The present invention is also applicable in some of its aspects to vehicles wherein the prime mover power source is other than an internal combustion engine; for example, a turbine. The prime mover power source could in some applications be located remotely from the vehicle. The direct current generator is preferably either a shunt type generator or a differential compound type generator. Each of the direct current traction motors is preferably of the cumulative compound type, having an armature 31, a series field winding 33, and a shunt field winding 35.

The armature or output terminals of DC generator 19 are connected via leads 37, 39 to respective first and second main line busses 41, 43. The wheel motors 11, 13, 15, 17 have their armature or output terminals connected via respective reversing switch means 45 in parallel and across the main line busses 41, 43.

The function of the reversing switch means 45 is to effect reversal of the respective motor series fields 33 for reverse operation of the machine. This reversing is accomplished responsive to actuation means 47. For details of suitable reversing switch means and actuation means, reference is made to U.S. Pat. Nos. 3,492,256 and 3,798,520.

AC generator 29 supplies 110 volt AC power for various purposes and has a ground or common terminal 49 and an output terminal 51. The terminals II - 6, III - 6, X - 2, XII - 5 and V - 7 are connected to the output terminal 51 of AC generator 29 for purposes to be hereinafter explained.

Disposed so as to be responsive to armature current of the left front and left rear wheel motors 13, 17 are respective DC current transductors 53, 55. These DC current transductors each have one terminal 57 connected to the output terminal 51 of AC generator 29 and have a respective other terminal VIII - 2 and IX - 2 for a purpose to be hereinafter explained.

The generator exciter 21 has a shunt field winding 59 which is connected to a direction control switch 61. An accelerator 63 has a first exciter field voltage control portion and a second accelerator position indicator portion. The first portion comprises a pair of resistances 65 connected in opposed parallel relation having one terminal 67 connected to ground or common and the other terminal 69 connected to terminal I - 4 for a purpose to be hereinafter explained. The first portion also comprises a wiper 71 for each resistance 65, the wipers being connected to the direction control switch 61. The second portion comprises a resistance 73 having a terminal 67 connected to ground or common, a terminal 75 connected to terminal I - 1, and a wiper 77 connected to terminal V - 6 for a purpose to be hereinafter explained. All wipers 71, 77 move in unison responsive to operator movement of the linkage mechanism of the accelerator 63. In general, it may be stated that a portion of the voltage that appears between terminal I - 4 and ground is selected according to the position of the wipers 71 and is applied via the direction control switch 61 to the generator exciter field 59. The direction control switch 61 functions to reverse the polarity of the voltage being applied to the generator exciter field, for reverse operation of the machine. The terminal V - 8 is connected to the direction control switch 61 to apply a signal to the accelerator conditioner component circuit V when the direction control switch 61 is in the machine reverse operation position, for a purpose to be hereinafter explained.

The motor exciter 23 has armature or output terminals $a$ and $b$ which are connected to the corresponding terminals $a$ and $b$ of the shunt fields 35 of the respective wheel motors 11, 13, 15, 17. The motor exciter 23 has two shunt field winding portions 79, 81, one of which is serially connected with terminals VII - 6 and VII - 7 and the other of which is serially connected with terminals VII - 8 and VII - 5 for a purpose to be hereinafter explained.

A tachometer generator 83 is mechanically driven by the right front wheel motor 11, as indicated by dashed lines 85. The tachometer generator 83 has one terminal connected to ground or common and the other terminal connected to the terminal IV - 5 for a purpose to be hereinafter explained. The terminals II - 4 and II - 5 are connected in parallel with the armature of wheel motor 11, and terminals III - 4 and III - 5 are connected in parallel with the main line busses 43, 41 for purposes to be hereinafter explained.

Figure 2:
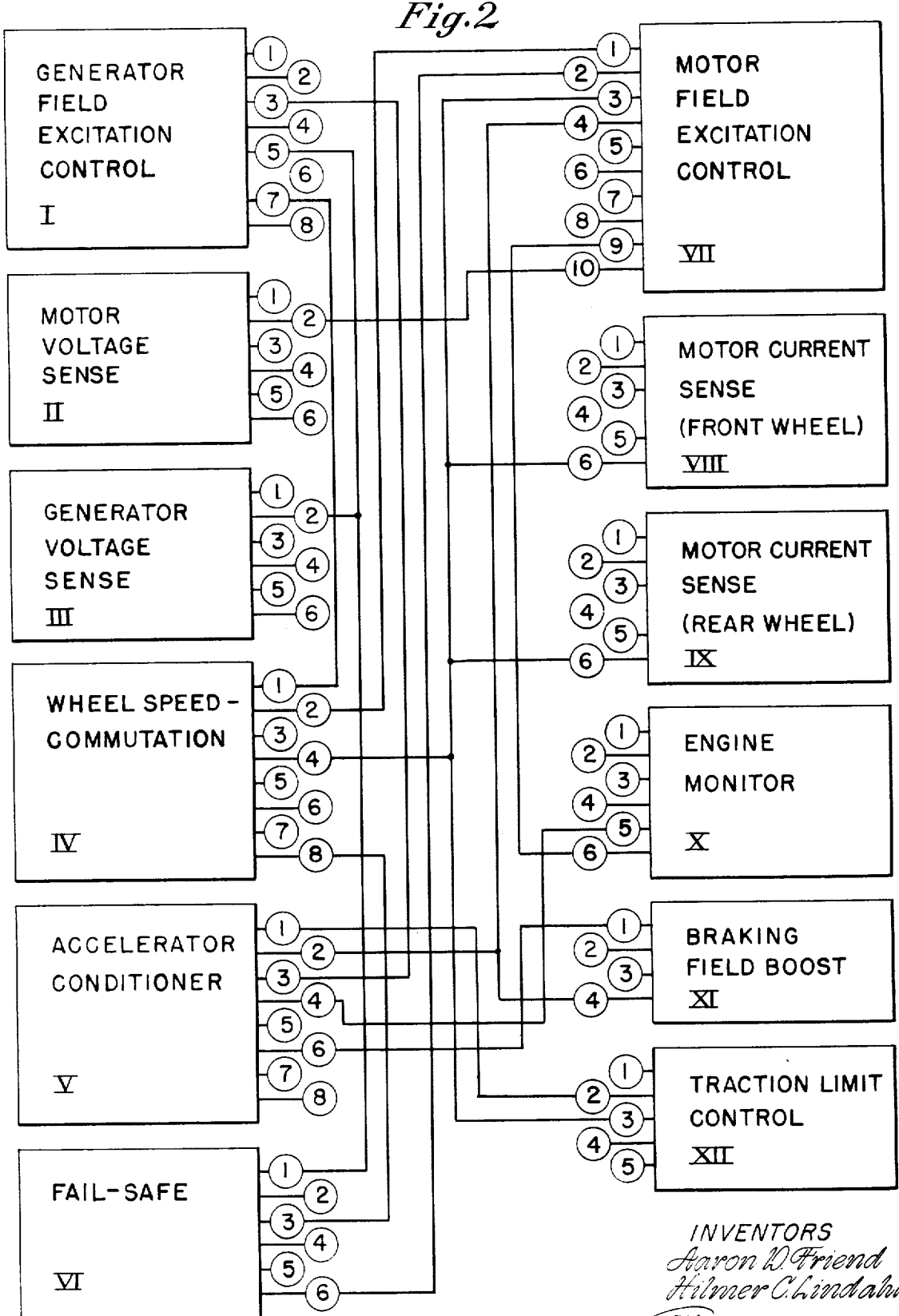
FIG. 2 is a block diagram showing various component circuits that are utilized in the vehicle propulsion control system and their interconnections, as well as identifying terminals for correlation with other Figures of the drawings. It should be noticed that each component circuit shown as a block has a Roman numeral designation, so that the terminals of the component circuits can be readily identified in correlation with other Figures of the drawings.
Figure 3:
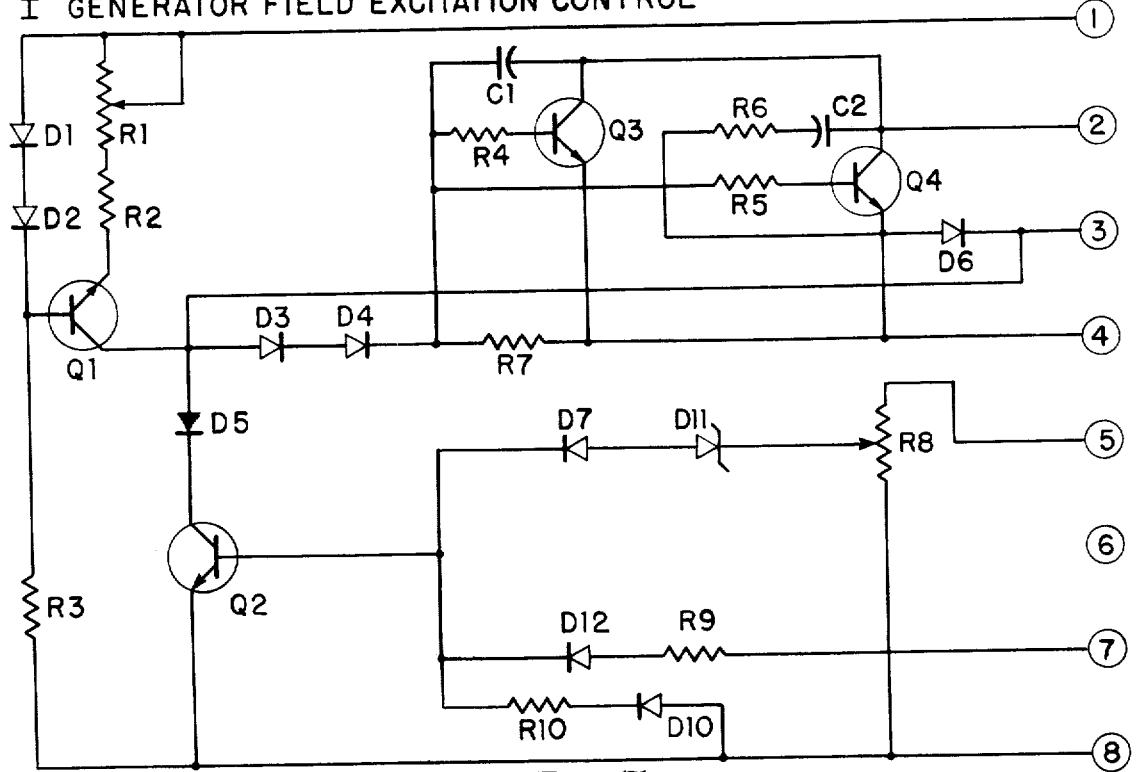
Figure 4:
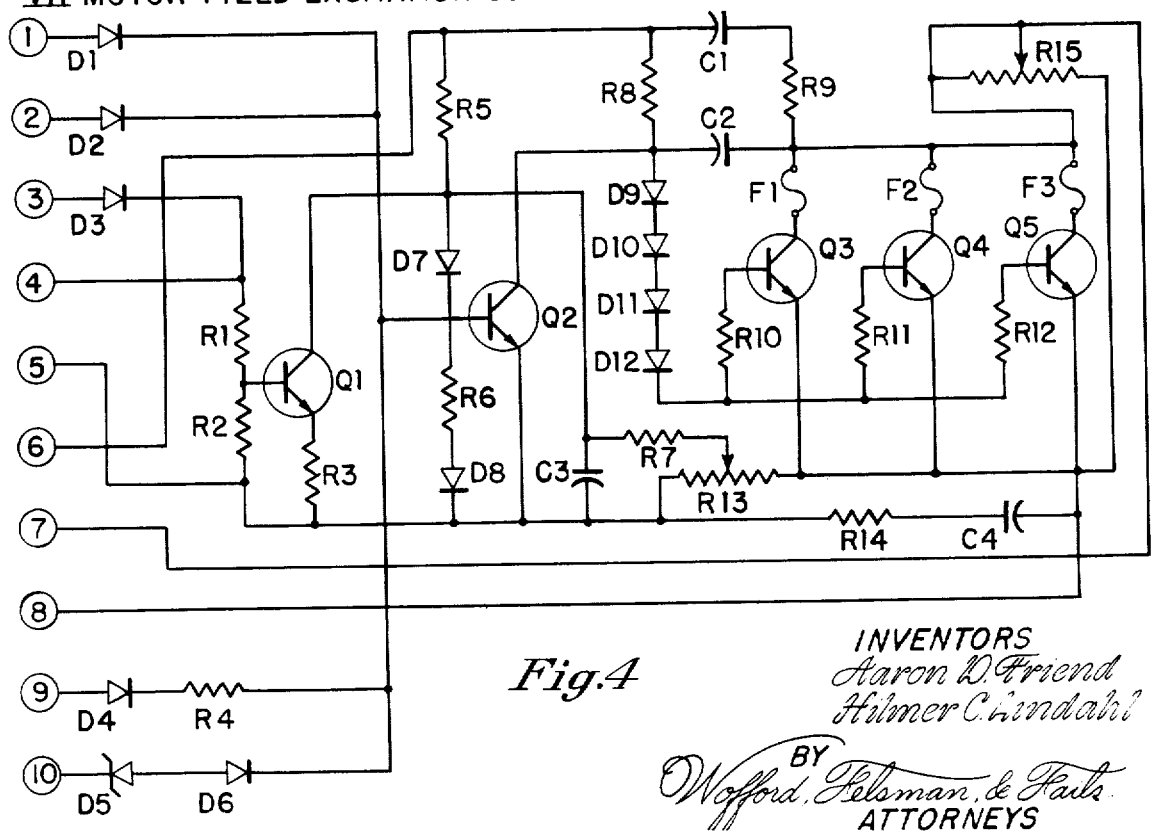

Referring now to FIG. 2 of the drawings there is shown in schematic block form the various component circuits that are utilized in the vehicle propulsion control system of this invention, and their interconnections. In this connection, reference may also be made to FIG. 14, which shows the general relation of the various component circuits to the overall propulsion control system but does not show the details of the interconnections. Each component circuit is given a Roman numeral designation, so that its terminals can be readily identified in correlation with other figures of the drawings. The component circuits are I - Generator Field Excitation Control, having terminals 1 through 8; II - Motor Voltage Sense, having terminals 1 through 6; III - Generator Voltage Sense, having terminals 1 through 6; IV - Wheel Speed - Commutation, having terminals 1 through 8; V - Accelerator Conditioner, having terminals 1 through 8; VI - Fail - Safe, having terminals 1 through 6; VII - Motor Field Excitation Control, having terminals 1 through 10; VIII - Motor Current Sense (Front Wheel), having terminals 1 through 6; IX - Motor Current Sense (Rear Wheel), having terminals 1 through 6; X - Engine Monitor, having terminals 1 through 6; XI - Braking Field Boost, having terminals 1 through 4; XII - Traction Limit Control, having terminals 1 through 5. The interconnections are as follows: I - 3 to V - 3; I - 5 to III - 2 and VI - 1; I - 7 to IV - 1; II - 2 to VII - 10; IV - 2 to VII - 1; IV - 4 to VII - 3, VIII - 6, IX - 6 and XII - 3; IV - 8 to VI - 3; V - 1 to XII - 2; V - 2 to VII - 4 and XI - 4; V - 4 to X - 5; V - 6 to XI - 1; VI - 6 to VII - 2; and VII - 9 to X - 6.

In FIG. 12 there is shown a 24 volt DC source 87 having a ground or common terminal 89 and a 24 volt output terminal 91. It should be noted that the terminals of the component circuits which are connected to ground or common, as shown by FIG. 12, are: I - 8, II - 1, III - 1, IV - 3, V - 5, VI - 5, VII - 5, VIII - 1, VIII - 5, IX - 1, IX - 5, X - 3, XI - 2, and XII - 4. Further, the terminals of the component circuits that are connected to 24 volt output terminal 91 are: I - 1, II - 3, III - 3, IV - 6, VI - 2, VII - 6, X - 1, and XI - 3. The 24 volt output terminal 91 is also connected via a current limiter 93 to terminal I - 2. Terminals of the component circuits which are shown in FIG. 1 of the drawings and have been previously mentioned are: I - 1, I - 4, II - 4, II - 5, II - 6, III - 4, III - 5, III - 6, IV - 5, V - 6, V - 7, V - 8, VII - 5, VII - 6, VII - 7, VII - 8, VIII - 2, VIII - 5, IX - 2, X - 2, and XII - 5. Terminals of the component circuits that are used for special purposes not pertinent to this invention are: IV - 7, VIII - 3, and IX - 3. Terminals of the component circuits that are not used are: I - 6, VIII - 4, and IX - 4.

It is known by those skilled in the art that basically the machine is controlled by varying the field excitation of the DC generator 19 and the wheel motors 11–17. This variation is accomplished in part by movement of the linkage mechanism of the accelerator 63 by the operator and in part automatically responsive to signals derived from a sensing of various machine operating conditions. Automatic variations in generator field excitation are applied via the component circuit designated I - Generator Field Excitation Control and automatic variations in wheel motor field excitation are applied via the component circuit designated VII - Motor Field Excitation Control. The other component circuits derive signals responsive to various machine operating conditions, including operator demand as signaled by accelerator position and motion, and supply appropriate signals to the component circuits I and VII to accomplish automatic excitation variation such as will effect optimum machine performance.

Each component circuit I – XII, its purpose, function and relation to the overall propulsion control system will now be described. For convenience, all circuit parts are designated by a capital letter followed by a numeral, as follows: resistors Rn, capacitors Cn, diodes Dn, transistor devices Qn, transformers Tn, and fuses Fn, and in the interest of brevity, sometimes only the letter and numeral designation will be used herein.

I - Generator Field Excitation Control: parts D1, D2, R1, R2, R3 and Q1 compose a constant current source for this component circuit. Diodes D1 and D2 together with R3 maintain an adequately fixed voltage reference to the base of Q1. The resistances R1 and R2, in the emitter circuit of Q1 adjust the voltage drop in that circuit to obtain or set the predetermined or desired magnitude of collector current in Q1. Should the collector current of Q1 tend to increase, the base to emitter voltage will decrease to reduce the base current and thus maintain the collector current at the predetermined magnitude. This action then operates to maintain the collector current constant within acceptable limits with varying amounts of collector to terminal 1 voltage.

A current path through D3, D4, R4 and R5 directs current to the bases of Q3 and Q4. These transistors then conduct current via their collectors from terminal 2 to terminal 4, and of magnitude depending upon the current available for the bases of Q3 and Q4. A current path from the constant current source to the common terminal 8 is provided via diode 5 and the collector of Q2, with the magnitude of Q2 collector current depending upon the magnitude of current impressed on the base of Q2. When no signals are applied to the base of Q2, all of the current of the constant current source will be applied to the bases of Q3 and Q4. When positive signals are applied to the base of Q2, a portion of the collector current flow will be diverted from Q3 and Q4 to pass through Q2 to common terminal 8.

Signals supplied to terminal 5 from III - Generator Voltage Sense are divided in R8, subtracted from by zener diode D11 and passed through D7 to the base of Q2, thus causing a diversion of current from the bases of Q3 and Q4 resulting in a decrease of collector current in Q3 and Q4 and thus effecting via terminals 2 and 4 an appropriate reduction of the generator exciter field responsive to over voltage of the DC generator. When signals are supplied to terminal 7 from IV - Wheel Speed - Commutation evidencing the condition of wheel motor over speed, they are passed through current limiting resistor R9 and D12 to the base of Q2, thus causing collector current to flow through Q2, diverting base current from Q3 and Q4 resulting in a decrease of collector current in Q3 and Q4 and thus effecting via terminals 2 and 4 a decrease of generator excitation.

Under certain extreme adverse conditions, requiring cancellation of the residual magnetisim, it is necessary to reverse the polarity of the excitation to the generator exciter field. Such conditions can occur, for example, when the machine wheels are stalled and cannot turn, while the operator via the accelerator is demanding wheel motion. When such condition occurs, a signal of considerable magnitude is impressed on terminal 3 through diode 6 to the bases of Q3 and Q4 to turn them off. This signal must, of course, be sufficient to overcome the current of the constant current source.

R4 and R5 are current equalizing and parasitic oscillation reduction resistors for Q3 and Q4 parallel operation. R6, C1 and C2 act to suppress parasitic oscillation. R7 provides a base circuit to emitter conductor path for Q3 and Q4 to reduce transistor internal leakage effects R10 and D10 serve as a temperature compensated resistive load to nullify internal leakage effects in Q2. D5 prevents any effects of the negative drive voltage impressed on terminal T3 from having adverse effects upon transistor Q2.

In summary, component circuit I - Generator Field Excitation Control serves to effect via its output terminals 2 and 4 automatic variations in generator field excitation responsive to (a) generator over voltage as sensed from component circuit III and received via input terminal 5, (b) wheel motor over speed as sensed from component circuit IV and received via input terminal 7, and (c) conditions requiring cancellation of residual magnetism evidenced by signal on input terminal 3 from component circuit V.

VII - Motor Field Excitation Control: the field of the motor excitator is composed of two sets of windings 79, 81 and the output control from component circuit VII is applied in series with these winding sets and between same. Thus, one terminal, VII - 5, of winding 81 is connected to ground or common while the other terminal VII - 8 is one output terminal of component circuit VII. The other output terminal of component circuit VII, VII - 7, is connected to one terminal of winding set 79 while its other terminal, VII - 6 is connected to the 24 volt DC source 87. Three transistors Q3, Q4 and Q5 are connected effectively in parallel to provide requisite capacity for carrying the motor excitator field current via output terminals VII - 7 and VII - 8. Fuses F1, F2 and F3 are so sized that if one of the transistors should short, the respective fuse will open and require the remaining transistors to carry the current. A resistance R15 is connected in parallel with the transistors Q3, Q4 and Q5 to establish a flow path for minimum motor excitator field winding current when all of the transistors Q3, Q4 and Q5 are either completely cut off due to base circuit control or the fuses are all open due to excessive current.

Base current to transistors Q3, Q4 and Q5 is obtained via terminal 6 from the 24 volt DC source 87 through resistor R8, diodes D9 through D12, R10, R11 and R12. When transistor Q2 is caused to conduct by an appropriate signal applied to its base, a portion of the current is diverted from the base of Q3, Q4 and Q5, causing a decrease in current through the windings 79, 81 of the motor excitor and a consequent reduction of wheel motor excitation.

When the machine is standing with the internal combustion engine 25 operating at normal speed, and all electrical circuits are energized, it is desirable that a medium amount of wheel motor field excitation be provided so that internal heating of the wheel motors and motor excitor will be reduced. Accordingly, a small amount of base current to transistor Q2 is provided to effect reduction of the motor field excitation to a desirable level that can be increased or decreased as machine operating conditions require. A very small portion of this base current to transistor Q2 is supplied via resistor R5, but the primary portion is obtained by connection of R13 between terminals 8 and 5 or across motor excitor winding portion 81. A selected portion of current from R13 is passed through R7 and D7 to the base of Q2 to set the medium field excitation required. By taking a voltage from the field winding 81, there is a measure of feed back that will tend to reduce or compensate for the effects of variations in direct current supply voltage, temperature, etc.

There are some machine operation conditions under which or responsive to which it is desirable to decrease wheel motor field excitation. For convenience herein, these are termed "diminish functions". Also, there are some machine operation conditions under which or responsive to which it is desirable to increase motor field excitation. For convenience herein, these are termed "increase functions". The component circuit VII receives inputs and acts to effect the desired consequent motor field excitation variations or changes signaled by four diminish functions and two increase functions.

The first diminish function may be termed "commutation limit control". Under the dynamic braking condition, it is highly desirable to control the regenerative braking current so as to keep it within the commutation limits of the respective wheel motor. A signal is supplied from component IV to terminal 1 for this purpose. This signal is passed through diode D1 to the base of Q2.

The second diminish function may be termed "engine over speed". Under some conditions of dynamic braking, for example, when braking on a long hill, sufficient horsepower may be delivered to the internal combustion engine 25 from the direct current generator (acting as a motor) to tend to increase the engine speed beyond a desirable maximum. A signal proportional to engine over speed is supplied from component circuit X to terminal 9. A resulting current is conducted through Diode D4 and resistor R4 to the base of Q2 causing a decrease of motor field excitation so that less horsepower will be supplied from the wheel motors (now acting as generators) to the direct current generator (then acting as a motor) to reduce engine speed.

The third diminish function may be termed "motor over-voltage". Under dynamic braking conditions the wheel motor voltage may tend to exceed a predetermined desirable maximum magnitude. A signal from component circuit II proportional to wheel motor voltage is applied to terminal 10. When this voltage exceeds the Zener voltage of D5, a current is passed through D6 to the base of Q2 to effect a reduction of motor field excitation.

The fourth diminish function may be termed "generator voltage". When the output voltage of DC generator 19 exceeds a predetermined magnitude, for example 300 volts, it is desirable to decrease motor field excitation in a predetermined linear manner as the generator output voltage increases to a second predetermined magnitude, for example 600 volts. This programed reduction of motor field excitation enhances wheel motor efficiency. This action is effected by a signal from component circuit III applied to terminal 2 and passed through D2 to the base of Q2.

The first increase function may be termed "high wheel motor current". When the wheel motor current exceeds a certain magnitude, then it is desirable to increase the motor shunt field excitation as a function of the excess current. For this purpose, signals from component circuits VIII and IX are applied to terminal 3 and via D3 and R1 to the base of Q1, causing Q1 to conduct and divert current from the base of Q2. Assuming absence of signals on terminals 1, 2, 9 and 10, the conduction of Q2 will be decreased, causing an increase of motor field excitation. The magnitude of such increase will be determined first by the extent of diversion of current by Q2 and second, if that diverted current is sufficient to cut off Q2, then by the excitor characteristics and the maximum excitor field current flow permitted by Q3, Q4 and Q5.

The second increase function may be termed "quick accelerator action". When the operation makes a demand for rapid machine acceleration, by suddenly pushing the linkage mechanism of accelerator 63 down, then it is desirable that the wheel motor field excitation be increased quickly before the wheel motor armature current has time to increase, so that the motor is operating at its highest efficiency immediately following the operator demand for rapid acceleration. To accomplish this, a signal from component circuit V is applied to terminal 4 and consequently to the base of Q1, resulting in diversion of current from the base of Q2 and (assuming no signals on terminals 1, 2, 9 and 10) causing a quick boost of motor field excitation. Thus, the motor field excitation is quickly increased in anticipation of increased motor armature current.

It should be particularly noted that diminish functions take priority over increase functions. Increase functions signals impressed upon the base of Q1 (via terminals 3 and 4) will result in an increase of motor field excitation only if diminish function signals impressed on the base of Q2 (via terminals 1, 2, 9 and 10) are not of such magnitude that the motor field excitation is diminished. Small amounts of diminishment can be counteracted by boost or increase function signals.

R1 and R3 act to reduce the loading of transistor Q1 upon the increase function inputs. R2 is a base load to reduce leakage effects within Q1. R6 and D8 make up a temperature compensated base load to reduce leakage effects within Q2. Diodes D9, D10, D11 and D12 give a stabilized voltage drop between the collector Q2 and the bases of Q3, Q4 and Q5 to assist in completely turning these transistors off when that is desired. The saturation voltage of Q2 may be higher than cutoff of Q3, Q4 and Q5. Resistors R10, R11 and R12 are current equalizing and parasitic oscillation suppressors for parallel transistor operation. Capacitors C1, C2, C3 and C4 and resistors R9 and R14 inhibit oscillation tendencies of the high indutance load upon the circuit.

In summary, component circuit VII - Motor Field Excitation Control serves to effect via its output terminals 7 and 8 automatic variations in wheel motor field excitation responsive to certain increase functions and diminish functions, with the diminish functions having priority over the increase functions. The diminish functions are (1) commutation limit control effected by input signals from component circuit IV to terminal 1, (2) engine over speed as evidence by input signals from component circuit X to terminal 9, (3) motor overvoltage as evidenced by signals from component circuit II applied to terminal 10 and (4) generator voltage effected by signals received from component circuit III and via terminal 6 of component circuit VI and applied to terminal 2. The increase functions are (1) high wheel motor current effect by signals received from component circuits VIII and IX and applied to terminal 3 and (2) quick accelerator action effected by signals received from component circuit V and applied to terminal 4.

Figure 5:
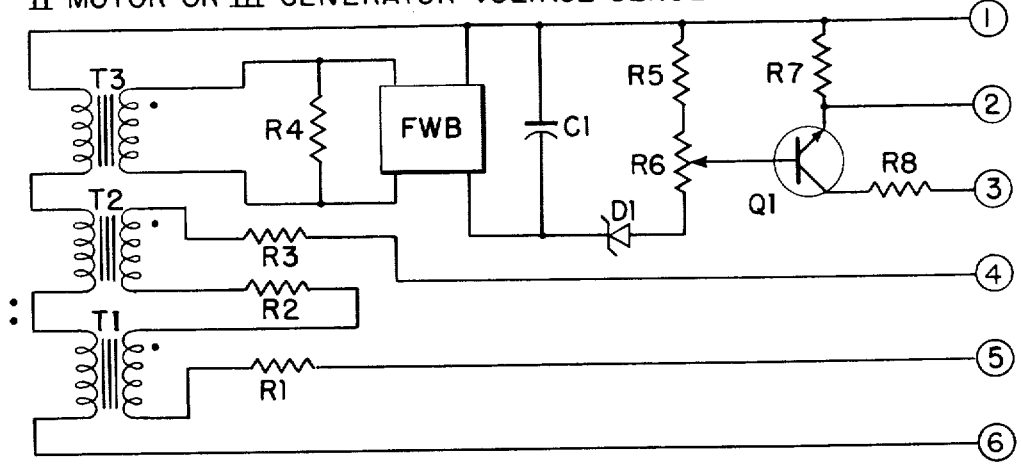

II - Motor or III - Generator Voltage Sense: for proper operation of the vehicle propulsion control system of this invention it is required that the direct current generator and the wheel motor voltages be sensed by means such that there will be no electrical continuity between the voltage sensed and the output signals of the sensing circuit. Although circuit parameters may be appropriately varied, the same sensing circuit can be used for sensing either DC generator voltage or wheel motor voltage and consequently only one such circuit (see FIG. 5) in herein shown and described. The input or voltage to be sensed is applied to terminals 4 and 5 which are serially connected with the secondary windings of saturable reactor type transformers T1 and T2. Resistors R1, R2 and R3, in series with these secondary windings causes a current flow in the secondary windings proportional to the magnitude of the direct current voltage being sensed. A series circuit may be traced from terminals 6 via the primary windings of T1 and T2 and the primary winding of a transformer T3 to terminal 1. T1 and T2 are so phased that the primary windings are in bucking relation and the secondary windings are in adding relation. AC voltage is applied via terminal 6 to the primary windings of T1, T2 and T3. The impedance of the primary windings of transformers T1 and T2 will vary as a function of the current flow through their secondary windings, which in turn is a function of the sensed voltage. The current flow through the primary of transformer T3 is reflected in its secondary winding circuit. This current is rectified by rectifier FWB and filtered by C1. Because there is a residual voltage when no voltage is being sensed, Zener diode D1 subtracts a fixed amount of this residual voltage before it is divided as necessary by R5 – R6.

Transistor Q1 provides an output voltage at terminal 2 which is a function of the voltage being sensed. R7 is a fixed emitter load to Q1 and R8 limits dissipation of Q1. R4 is a fixed load to T3 and improves linearity.

In summary, an input signal which is the voltage to be sensed is applied to terminals 4 and 5. If wheel motor voltage is being sensed, this input voltage may be taken from terminals II - 4 and II - 5 (see FIG. 1). If the DC generator voltage is being sensed, the input may be taken from terminals III - 4 and III - 5 (see FIG. 1). The output signal will appear between terminals 1 and 2 and is applied to terminals of other component circuits as elsewhere herein described.

Figure 6:
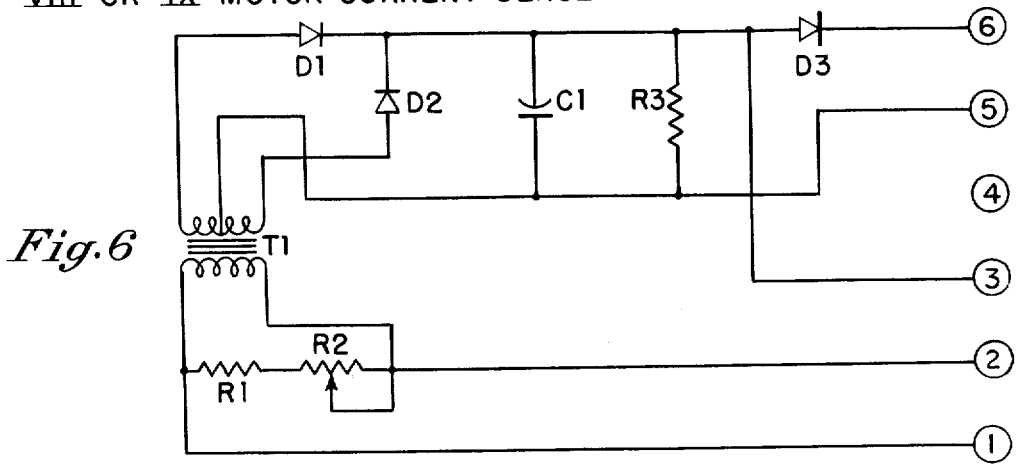
Figure 7:
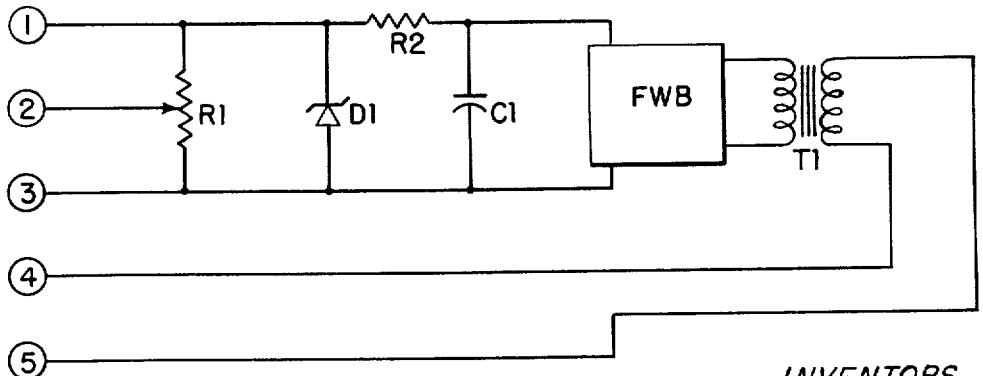
Figure 13:
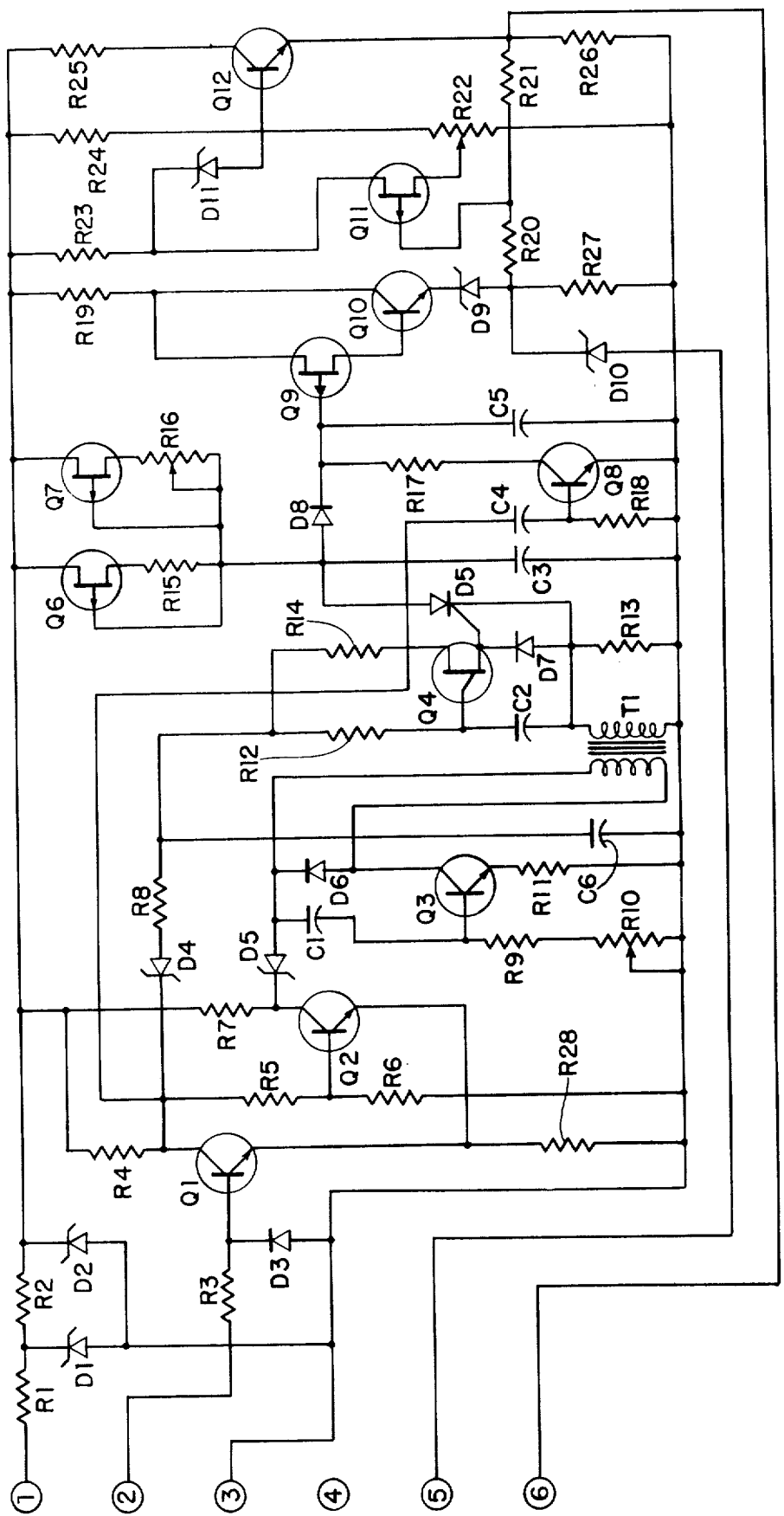

VIII or IX - Motor Current Sense: a motor current sense is provided for front wheel motors (component circuit VIII) and also for rear wheel motors (component circuit IX). The same circuit can be used for each case and therefore is herein shown (see FIG. 6) and described only once. The front wheel motor current is sensed by DC current transductor 53 whose output would then be applied between terminals 1 and 2. The alternating current output of transductor 53 will vary as a function of wheel motor current. The voltage thus produced by passage of this current through R1 and R2 is transformed to a convenient voltage by T1. Diodes D1 and D2 then rectify the resulting voltage, which is filtered by C1. R3 is a load on C1 to discharge it at the end of a signal from the transductor. Diode D3 is an isolating diode to prevent signals outside of terminal 6 from coming into the circuitry of this component circuit. An output signal which is a function of the wheel motor current is then available between terminal 5 and terminal 3 (not isolated) or between terminal 5 and terminal 6 (isolated). Output signals from DC current transductor 55 may be similarly applied to component circuit IX to produce output signals which are a function of the rear wheel motor current.

In summary, input signals from a respective transductor output are applied between terminals 1 and 2 and output signals which are a function of the motor wheel current being sensed are available either between terminal 5 and terminal 3 (not isolated) or between terminal 5 and terminal 6 (isolated). These output signals are then utilized by other component circuits as elsewhere herein described.

IV - Wheel Speed - Commutation: One of the functions of component circuit IV is to provide output signals that are a function of the wheel motor speed. Tachometer generator 83 which is driven by the right front wheel motor supplies an AC voltage input between terminals 3 and 5 at a level of approximately 28 volts per 1000 RPM of the wheel motor. Transformer T1 reduces and isolates this voltage from ground. Rectifier FWB converts the output voltage of T1 to direct current which is filtered by C1 and passed through resistors R1 and R2 to provide a direct current voltage which is a function of motor wheel speed. A portion of this voltage is fed from R2 to the base of Q1 in an emitter follower arrangement. R2 is adjusted so that the output of Q1 is 8 volts when the wheel motor armature is rotating at 4,000 RPM. Zener diode D1 is sized so that there is an output at terminal 1 when the wheel motor exceeds a predetermined speed. This is the wheel motor over speed signal which is fed to terminal I - 7. Diode D2 is an isolating diode. The output signal from Q1 is fed directly to terminal 8 to provide a wheel speed output signal to terminal VI - 3.

Another function of component circuit IV is to provide a commutation limit control signal which will appear as an output at terminal 2 and which is fed to terminal VII - 1. Input to terminal 4 from terminals VIII - 6 and IX - 6 provides input signals that are a function of wheel motor armature current. The emitter of Q1 provides a signal which is a function of wheel motor speed. A combination of these two signals, which is not necessarily a simple multiplication, is utilized to drive a voltage sensing amplifier to provide the desired output signal at terminal 2. Current drawn by R7 and R8 is quite small because of their high resistance, and the load of Q2 is extremely small, and therefore from a practical standpoint, only voltages with reference to ground or common need be considered relative to the operation of this circuit. At low speeds, Zener diode D3 will not be conducting, so that the voltage at junction C will be a function of wheel motor speed. As the wheel motor speed increases above that required to cause conduction of Zener diode D3, the voltage at junction C will rise approximately one-fourth as fast as the terminal 8 voltage. In the case of the input signal from terminal 4, at low wheel motor current levels, Zener diode D4 will not conduct, so that the voltage at junction B is a function of wheel motor current. When the wheel motor current rises above the magnitude required for conduction of D4, then the voltage at junction B will rise at approximately one-fifth the rate of the rise of the signal input at terminal 4. The voltage at junction A will then be an average of the voltage functions appearing at junctions B and C. Transistor Q4 is biased by R12 such that Q4 remains cut off until the voltage at junction A begins to rise, indicating an excessive combination of signals from motor wheel speed and wheel motor current, meaning that a wheel motor is tending to exceed its commutation limits. Resistors R13 and R14 provide a path for bias signals to the base of Q5 such that Q5 conducts to provide voltage drop across R16 and R12. Zener diode D6 acts to clamp the voltage across R12 to maintain it at a convenient level. When Q4 conducts responsive to a rise of voltage at junction A, current is diverted from the base of Q5 so that the collector current of Q5 decreases, causing the voltage drop across R16 to decrease, raising the collector voltage of Q5. When the collector voltage of Q5 rises above a predetermined magnitude, Zener diode D7 becomes conductive to provide the desired output signal at terminal 2. The cut off level of Q4 may be adjusted by means of R12.

Another function of component circuit IV is to provide an output signal at terminal 7 when the wheel motor speed exceeds a predetermined level. The purpose of this output signal is to actuate a relay to insert additional resistance grid means under dynamic braking conditions. For details concerning this dynamic braking action, reference is made application Ser. No. 139,661, entitled "Dynamic Braking System for Electrically Powered Vehicles", filed May 3, 1971, now abandoned. To provide the aforesaid output signal at terminal 7, resistance R3 may be adjusted to cause conduction of Q2 when a wheel motor reaches a predetermined speed. Q2 in turn causes conduction of Q3, which conducts the requisite current to operate the aforesaid relay. Capacitors C2 and C3 act to reduce relay armature vibration at the actuation level.

R4 is a constant resistive load to the emitter of Q1. R11 is a constant resistive load to diode D5. R15 serves as a part of a voltage divider to cut off Q5 earlier than would otherwise be the case.

In summary, component circuit IV - Wheel speed - commutation receives input signals at terminal 4 which are a function of wheel motor current from terminals VIII - 6 and IX - 6, and input signals to terminal 5 which are a function of wheel motor speed and which are received from tachometer generator 83. Component circuit IV serves to provide output signals (1) at terminal 1, signifying wheel motor over speed and fed to terminal I - 7, (2) wheel motor commutation limit control signals at terminal 2 and fed to terminal VII - 1, (3) signals at terminal 8 which are a function of wheel motor speed and are fed to terminal VI - 3 and (4) switch action to activate a relay to insert additional dynamic braking resistance, the relay coil being connected to terminal 7.

V - Accelerator Conditioner: One of the functions of component circuit V is to provide output signals at terminal 2 responsive to the quick accelerator action condition, which occurs when the operator makes a demand for rapid machine acceleration as signaled by a sudden depression of the linkage mechanism of accelerator 63. An input signal is applied to terminal 6 from the wiper 77 of accelerator position indicator potentiometer 73, causing C1 to be charged to a voltage which is a function of the position of wiper 77. As long as the voltage on terminal 6 is changing reflecting depression of the accelerator, C1 is being charged. As long as C1 is being charged, a current which is a function of the rate of charge of C1 flows via D1 and R1 to the external circuit of terminal 2 and effects an increase in motor field excitation. This excitation increase is present only while capacitor C1 is charging and not when the voltage on terminal 6 is in a steady state condition. When the accelerator is relaxed, causing a decrease of voltage on terminal 6, then capacitor C1 discharges via diode D2.

Another function of component circuit V is to provide output signals on terminal 3 which are fed to terminal I - 3 to effect quick reduction or cut off of generator field excitation. AC voltage is applied between terminals 7 and 5 from AC generator 29 thus supplying power to the primary winding of transformer T1 the secondary output of which is rectified by rectifier FWB. When transistor Q1 is rendered conductive, the power supplied from rectifier FWB is such as to drive terminal 3 negative, causing a very rapid decrease of generator excitation and even a slight reversal of same. When an extreme adverse condition requiring quick reduction or cut off of generator field excitation occurs this condition may be evidenced by a reduction in RPM of engine 25, which reduction is sensed by component circuit X, which then applies an appropriate signal to terminal 4. This signal is passed via D3 to Zener diode D4 which will conduct when the voltage applied to terminal 4 exceeds the Zener characteristic voltage, at which time transistor Q1 is turned on. At the lower magnitudes of voltage applied to terminal 4, signifying modest reductions in engine RPM, a path for current flow is provided via R2 and R3 to the base of Q1. When the voltage applied to terminal 4 is less than the forward drop across diodes D5 through D9, resistance R4 does not affect the voltage at the junction between R2 and R3. As the voltage on terminal 4 increases, the diodes D5 through D9 will conduct and with R4, will attenuate voltage changes. The combined action of this circuit gives proportional drive to Q1 up to the conduction of diodes D5 through D9, and thereafter a degree less than proportional up to the conduction of Zender diode D4, which puts all of the change upon the base of Q1. The saturation curves of the DC generator and its excitator require this shaping to minimize surging of the complete system.

Another function of component circuit V is to provide a reduction, and in extreme cases a reversal, of the generator excitation to relieve the DC system of excessive currents when the wheel motor currents as limited by component circuit XII - Traction Limit Control are exceeded. A signal from component circuit XII is applied to terminal 1 and when this signal exceeds the conduction voltage of Zener diode D10, Q1 is turned on, so as to effect, via terminal 3, the appropriate generator excitation reduction action.

Another function of component circuit V is to cause a momentary quick reduction or cutting off of the generator field excitation responsive to extreme decelleration of the machine, as for example, when it encounters an obstacle. The mercury switch 95 reacts to sudden machine decelleration by momentarily closing to cause a charging of capacitor C2 through the base of Q1, D12 and R5 from the voltage on the wiper 77 of the accelerator position indicator potentiometer. C2 discharges through R6 during times between closings of the mercury switch and the time constant is such that rapid jostling will nullify the effect of this circuit. The charging action of C2 results in the turning on of Q1 to effect quick reduction or reversal of generator field excitation via terminal 3. A signal from direction control switch 61 indicating that the machine is in the reverse operation condition is applied to terminal 8 to cause conduction of Q2 so as to prevent the circuit involving mercury switch 95 from being effective. Diode D13 prevents excessive negative voltages from damaging Q2 and resistor R8 limits peak current in Q1.

In summary, component circuit V - Accelerator Conditioner receives input signals on terminal 1 from component circuit XII, which signals are utilized to effect traction limit control; input signals on terminal 4 from component circuit X evidencing engine under speed; input signals on terminal 6 from wiper 77 of accelerator position indicator potentiometer 73; and input signal on terminal 8 from direction control switch 61 to indicate that the machine is in the reverse operation condition. Component circuit V provides output signals at terminal 2 which are applied to component circuit VII to effect a momentary increase in motor field excitation under the quick accelerator action condition; and output signals are provided at terminal 3 and fed to component circuit I to effect rapid decrease or cut off of generator field excitation under certain machine operating conditions.

XII - Traction Limit Control: The function of this component circuit is simply to provide a suitable source of direct correct voltage, a selected portion of which may be added to the signals from the component circuits VIII and IX and the resultant applied to component circuit V to effect the desired machine traction limit control. Voltage from AC generator 29 is applied to input terminals 4 and 5 and is transformed by transformer T1 and rectified by rectifier FWB. The output of FWB is filtered by the combination of C1 and R2 and is clamped by zener diode D1, so that a fixed direct current voltage appears across R1. The potentiometer R1 is located at the operator control position so that the operator, by moving the wiper, can adjust the voltage which appears across terminals 2 and 3. This is the voltage that is added to the voltage signal from component circuits 8 and 9 and the resultant applied to terminal 1 of component circuit V. The resultant function of component circuit V has been heretofore explained. The operator may adjust R1 according to machine operating conditions. For example, if the machine is a frontend loader, the maximum traction that the operator will want to apply to the vehicle wheels may depend upon the type of terrain the machine is on and the type of material being loaded.

XI - Braking Field Boost: The function of this component circuit is to supply a signal to component circuit VII responsive to a quick relaxation or release of the accelerator linkage mechanism, which signal will result in an increase in wheel motor exitation for a brief period of time (for example, 10 seconds maximum). This exitation increase will start the regenerative or dynamic braking cycle and the braking current will be maintained by increased motor field current so long as the braking demand continues. A "dead band" is designed into this component circuit to permit a small relaxation movement of the accelerator without starting a braking action.

An input signal is applied to terminal 1 from the wiper 77 of accelerator position indicator potentiometer 73, causing C1 to be charged as the accelerator is depressed. At this time, Q1 and Q2 are conducting, so that the Q2 collector voltage is very low. When the accelerator pedal is relaxed, a decreasing voltage signal is applied to terminal 1 and when this signal is sufficient to overcome the characteristic voltage of Zener diode D1, current is diverted from Q1 to change the charge on C1, causing Q1 and Q2 to be cut off. When Q2 is cut off, its collector voltage rises causing an output signal at terminal 4 which is then applied to component circuit VII to cause an increase in motor field exitation for a brief time period. Zener diode D3 prevents the Q2 collector voltage from rising above a predetermined magnitude. Zener diode D1 acts as a dual purpose device. That is, when the accelerator being depressed, it acts as a normal diode, but when the accelerator is being relaxed, it permits the accelerator to be moved an amount depending upon the characteristic Zener voltage, before capacitor C1 is required to change its charge and casuse the motor field excitation increase. As a result, there is a "dead band" which permits a small amount of relaxation movement of the accelerator pedal without starting a braking action. D2 prevents excessive reverse voltages from being applied to C1; R3 prevents excessive currents into the base of Q2; R4 provides resistive load to Q1 to minimize leakages; and R6 limits current output to terminal 4.

VI - Fail - Safe: This component circuit performs three important functions. First, if there is a failure in tachometer generator 83 or its output circuit, the wheel motor field exitation is maintained at sufficient level to prevent excessive wheel motor speed. This accomplished by impairing the programmed diminish function signal from III - 2 via VI - 1 and 6 to VII - 2. In other words, the third diminish function as previously herein described with reference to component circuit VII is impaired. Second, if malfunction or failure within component circuit I should cause full direct current supply voltage to be applied to the accelerator potentiometer terminal I - 4, then the resulting generator field exitation could cause excessive wheel motor speed. This condition is prevented by sensing excessive output from component circuit I and consequently impairing the action of the third diminish function above mentioned, to maintain motor field exitation at acceptable levels. Third, a sufficiently rapid decrease in generator output voltage can cause excessive wheel motor armature voltages to occur before component circuit VII has time to react to a signal from component circuit II. To prevent such excessive motor armature voltages, component circuit VI acts to delay or slow down the effect of rapid decay of generator output voltage on motor field exitation.

Under normal machine operating conditions, the inputs at terminals 3 and 4 are such tht Q1 is conducting and Q2 is cut off. When Q2 is cut off, the normal third diminish function signals are passed via terminals 1 and 6. However, when Q2 conducts, impairment of the third diminish function occurs as above mentioned. The 24 volt DC supply applied to terminal 2 causes current flow through R1 to a divided circuit of either diode D1 and terminal 3 or resister R2 and the base of Q1. If the voltage applied to terminal 3 is sufficient, indicating normal operation of tachometer generator 83 as evidenced by suitable input signal on terminal 3 from IV - 8, then diode D1 will not conduct and the current will flow through R2 to the base of Q1. However, if the voltage applied to terminal 3 decreases sufficiently, indicating malfunction of tachometer generator 83, then current will flow through D1, decreasing base current to Q1, causing a rise in Q1 collector voltage which acts via resisters R4 and R5 to drive Q2 to the conducting state. Conduction of Q2 causes a diversion of a significant amount of the signal that would normally be passing from terminal 1 to terminal 6, thus causing impairment of the third diminish function as above mentioned.

If the voltage applied to the accelerator potentiometer becomes excessive, indicating malfunction within component circuit I, then the voltage at terminal 4 will exceed the characteristic voltage of Zener diode D4, causing current to flow via R9 to the base of Q1, causing conduction of Q2 and impairment of the third diminish function in the manner hereinabove mentioned.

Signals from component circuit III impressed on terminal 1 will cause current flow through D2 and R6 and also through R7. Current flowing through D2 and R6 will flow into Q2 if it is conducting and if not, via R8 to terminal 6. As voltage increases on terminal 1, C1 is charged through R7. Should the voltage on terminal 1 then be decreased, the charge on C1 will flow through D3 and either through Q2 (if it is conducting) or through R8 to terminal 6. The action of this circuit is such that rises of voltage on terminal 1 are reflected rapidly at terminal 6 whereas reductions in voltage on terminal 1 are reflected with some delay or slow down on terminal 6.

X - Engine Monitor: This component circuit acts to generate a signal which appears at terminal 5 and is a function of engine under speed and to generate a signal which appears at terminal 6 and is a function of engine over speed. These signals are utilized by external circuitory to maintain the engine speed within an optimum efficiency range. In other words, these signals control or temper the effect of the demands made upon the engine, so that optimum engine efficiency is realized. Such action is fast and automatic and is much more effective than could be achieved by manual control. Further, the operator is thus relieved of a tedious part of his responsibility to get maximum operating efficiency from the engine.

The basic concept of the engine monitor circuit, in its approach to generation of the desired output signals is that the time of a half cycle of the output voltage of AC generator 29 (which is of course coupled to the engine) is compared with a fixed or standard time circuit which represents a selected predetermined frequency. If the time of the half cycle is greater than that of the fixed time circuit, a capacitor is allowed to charge at a constant rate until the end of that half cycle. This peak voltage is sensed and held until the corresponding point is reached in the next cycle. The hold circuit is forcibly brought down in anticipation of a shorter following cycle. If the cycle lengths are the same, the output will be almost pure direct current voltage, with small notches in it at the capacitor voltage sense times. The under speed signal output increases when the cycle length is greater than a selected length and the over speed signal output increases when the cycle length is less than a selected length.

Input voltage is applied to terminal 1 and is reduced and regulated by a two step Zener diode regulator composed of R1, R2, D1 and D2. A Schmitt Trigger arrangement centered about transistors Q1 and Q2 produces a square wave output synchronous with the alternating current line voltage (applied at terminal 2). Two outputs, one from each of the collectors of Q1 and Q2 are 180° out of phase with each other. The purpose of using a Schmitt Trigger square wave circuit is to obtain well defined zero crossover instances of alternating current voltage.

At the time when the voltage at terminal 2 is negative, Q1 is cut off, allowing its collector voltage to rise, which turns Q2 on through R5 so that its collector voltage decreases. At the time when the voltage at terminal 2 is positive, Q1 is in the conducting state, and its collector voltage is low, so that Q2 is cut off and its collector voltage is high. This collector voltage is reduced slightly by diode D5 and impressed upon the delay circuit of unijunction transistor Q3. The capacitance of C1 and resistance of R9 and R10 determine the time required for C1 to charge up to the intrinsic standoff ratio of the unijunction Q3. When this charge is sufficient, it is discharged into pulse transformer T1. From a previous cycle, SCR Q5 is latched on and when the output pulse from this transformer drives the cathode positive with respect to the anode, Q5 unlatches and allows capacitor C3 to charge at a constant rate by means of the circuit composed of Q6, Q7, R15 and %16. The capacitance of C3, its charging current, and charging time determines the quantity of charge on C3. The charge current must be greater than the latching current of Q5 under all operating conditions. Diode D8 conducts the voltage magnitude of this charge to C5.

When the voltage impressed on terminal 2 comes to the end of the positive half of an alternating cycle, the collector of Q1 goes to a higher positive voltage with respect to common or ground. This deactivates the SCR unlatch portion and prepares it for the next positive half cycle. With the Q1 collector voltage going positive, this voltage increase is conducted to C4 which then drives the base of Q8 to put a momentary load on C5 so that if the voltage of C5 is greater than the peak voltage of C3, it will be brought down. At the same time, through D4 and R8 voltage is supplied to a 1/10 millisecond delay system composed of Q4, C2, R12, and R14, which fires SCR Q5 to discharge capacitor C3. The purpose of the 1/10 millisecond delay is to place a short time load on C5 before C3 is discharged, in the event that the voltage on C5 is greater than that on C3.

Transistor Q8 is a field effect device but draws very little power from C5 and thus only senses the voltage charge on C5 and then drives the base of Q10 in a manner similar to a Darlington Pair emitter follower. To cancel out voltages thay may be present at frequencies above a selected frequency, Zener diodes D9 and D10 are so sized that output on terminal 5 only rises when the engine speed decreases below the normal no load idle speed (for example 2100 RPM). Should the frequency increase above this normal idle speed, a positive going signal is desired on terminal 6. This is accomplished by the phase reversal given by an amplifier stage. Inverse feedback gives the stability and load gain desired. R20 and R21 give feed back with Q11 sensing the voltage between these two resistors. Diode D11 subtracts from the voltage at the junction between R23 and Q11 to drive the base of Q12 for the proper output to terminal 6. Adjustable resistor R22 controls the bias on Q11 to the proper point in matching cutoff characteristics of Q11 to the circuit.

Diode D3 prevents excessive negative voltage from damaging Q1; D6 prevents inductive reaction of T1 from affecting Q3; D7 clamps negative voltage on the gate of Q5; R3 limits current to the base of Q1; R4 provides current path to collector of Q1; and supply 2 SCR latch circuit; R5 gives drive to the base of Q2 when Q1 is not conducting; R6 is a common return and voltage divider for the base of Q2; R7 provides a current path to the collector of Q2 and SRC unlatch time delay circuit; R8 is part of a filter circuit to prevent oscillations of Q4 from feeding into Q8; R11 provides temperature compensation for Q3; R13 is a load on the secondary of T1; R14 provides temperature compensation for Q4; R17 limits maximum capacitor discharge rate; R18 offers load and returns C4 to a fixed charge after the end of a negative cycle; R19 limits dissipation of Q9 and Q10; R24 is part of a voltage divider to establish bias on Q11; R25 limits dissipation of Q12; R26 offers fixed emitter load to Q12; R27 offers fixed emitter load to Q10; R28 gives emitter bias to Q1 and Q2; and C6 is part of a filter circuit to prevent oscillations of Q4 from feeding into Q8.

The foregoing disclosure and the showings made in the drawings are merely illustrative of the principles of this invention and are not to be interpreted in a limiting sense.

What is claimed is:

1. In a propulsion control system for an electrically powered vehicle wherein a plurality of direct current wheel drive motors having shunt fields are utilized and means are provided to accomplish automatic variations in motor field excitation responsive to first signals which are a function of selected vehicle operating conditions, and wherein power is supplied to said motors from a direct current generator having a shunt field and means are provided to accomplish automatic variations in generator field excitation responsive to second signals which are a function of selected vehicle operating conditions, and wherein said direct current generator is driven by an internal combustion engine which also drives an AC generator; the improvement wherein said first signals comprise one or more "increase" functions and one or more "diminish" functions and means are provided to effect priority for the diminish functions, and said second signals comprise a signal responsive to a condition requiring quick reduction or reversal of generator field excitation which may include a signal responsive to engine under speed.

2. The propulsion control system of claim 1, wherein said second signals comprise signals derived from an engine monitor and wherein said engine monitor produces respective output signals which are a function of engine over speed and engine under speed.

3. The propulsion control system of claim 2, wherein said engine monitor senses engine speed by means including means utilizing the output frequency of said alternator and comparing time periods for portions of cycles of said alternator frequency with fixed reference periods.

4. In a propulsion control system for an electrically powered vehicle wherein a direct current drive motor having a shunt field is supplied power from a direct current generator having a shunt field and means are provided to accomplish automatic variations in motor field excitation responsive to signals which are a function of selected vehicle operating conditions, and wherein means are provided to accomplish automatic variations in generator field excitation responsive to signals which are a function of selected vehicle operating conditions, and wherein an internal combustion engine drives said direct current generator and also an AC generator, the improvement wherein said signals include signals derived from an engine monitor component circuit wherein said engine monitor senses engine speed by means including means utilizing the output frequency of said AC generator and comparing time periods for portions of cycles of said AC generator frequency with fixed reference time periods and wherein said engine monitor produces respective output signals which are a function of engine over speed and engine under speed.

* * * * *